Figure 1:
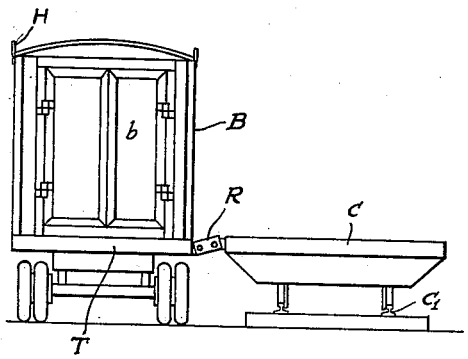

Jan. 18, 1938.　　　　　B. F. FITCH　　　　　2,105,476

TRANSPORTABLE CABLE WINDING MECHANISM

Original Filed Dec. 3, 1934　　　4 Sheets-Sheet 1

INVENTOR.
Benjamin F. Fitch,
BY
Bates, Goldrick & Fearn,
ATTORNEYS.

Jan. 18, 1938. B. F. FITCH 2,105,476
TRANSPORTABLE CABLE WINDING MECHANISM
Original Filed Dec. 3, 1934  4 Sheets-Sheet 2
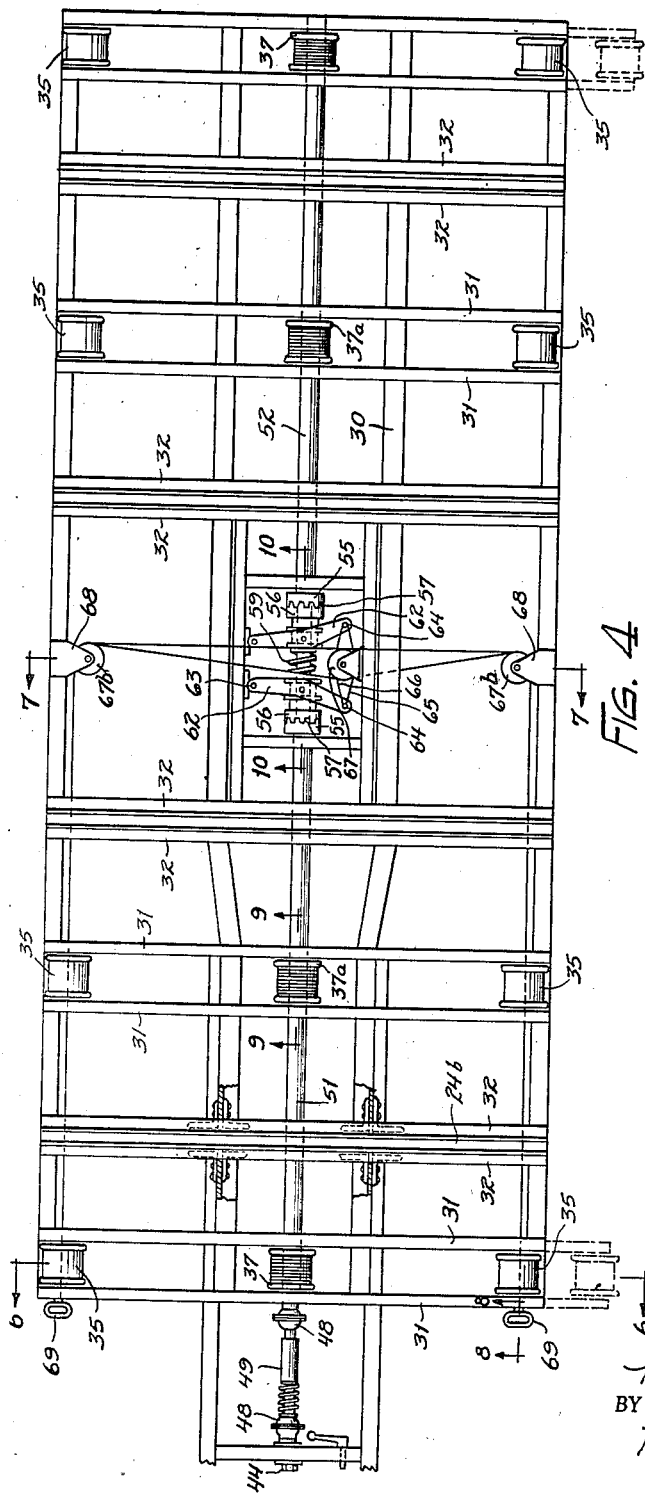
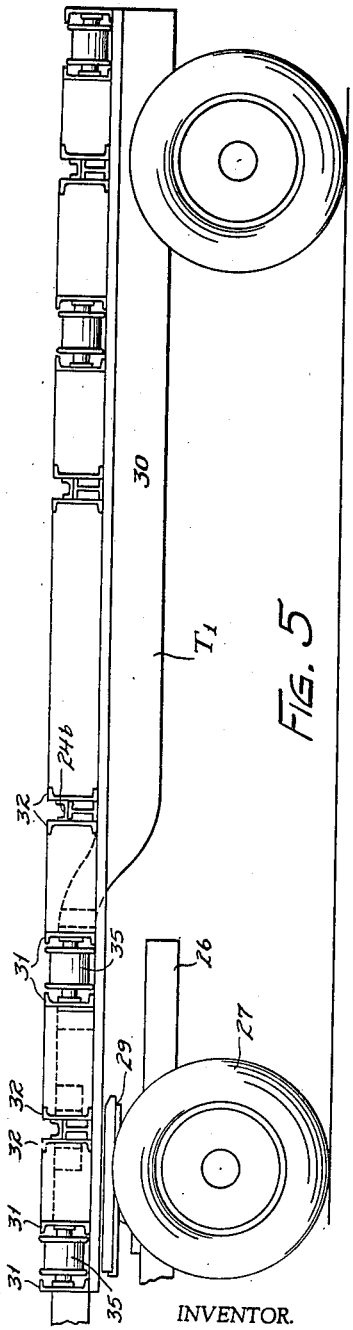
INVENTOR.
Benjamin F. Fitch,
BY
Bates, Golrick & Hearn
ATTORNEYS.

Jan. 18, 1938.     B. F. FITCH     2,105,476
TRANSPORTABLE CABLE WINDING MECHANISM
Original Filed Dec. 3, 1934     4 Sheets-Sheet 3
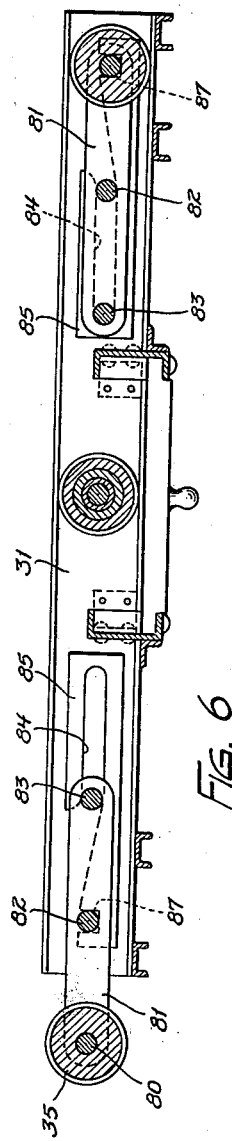
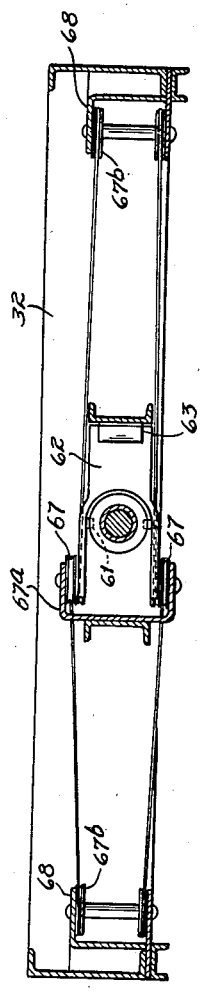
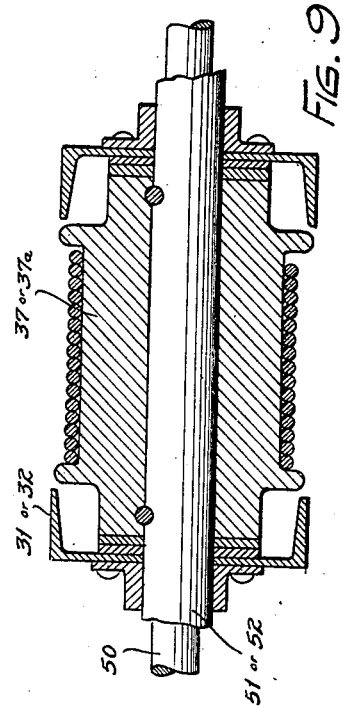
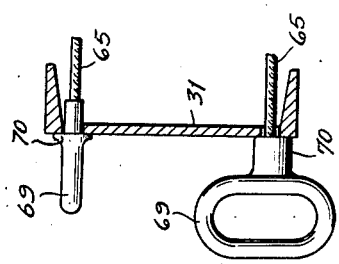
INVENTOR.
Benjamin F. Fitch,
BY
Bakis, Golnick & Tears,
ATTORNEYS.

Jan. 18, 1938.　　　　　B. F. FITCH　　　　　2,105,476
TRANSPORTABLE CABLE WINDING MECHANISM
Original Filed Dec. 3, 1934　　　4 Sheets-Sheet 4

INVENTOR.
Benjamin F. Fitch
BY
Baker, Golrick & Team,
ATTORNEYS.

Patented Jan. 18, 1938

2,105,476

UNITED STATES PATENT OFFICE 2,105,476

TRANSPORTABLE CABLE-WINDING MECHANISM

Benjamin F. Fitch, Greenwich, Conn., assignor to Motor Terminals Company, New York, N. Y., a corporation of Delaware Original application December 3, 1934, Serial No. 755,752. Divided and this application July 18, 1935, Serial No. 32,132

14 Claims. (Cl. 254—166)

This invention relates to a transportable cable-winding mechanism, and especially to a vehicle having a cable-winding mechanism thereon to move a demountable freight container to and from the vehicle. The present application is a division of my copending application for Letters Patent filed December 3rd, 1934, and assigned Serial No. 755,752.

In my copending application above referred to, I have described and claimed a system of handling freight wherein the freight is stored in demountable freight containers or bodies which are slid substantially horizontally from a motor vehicle or platform to a railway car, transported thereby to a distant point and slid therefrom to a motor vehicle which carries the containers to a shipper's platform to which they are slid to permit utilization of the truck for other loads during the unloading or loading operations. In such a system I prefer to provide the containers and carriers with coacting members to guide the container for a horizontal sliding movement from one surface to another, and I also prefer to utilize a mechanism operable by the power plant of one of the vehicles for sliding the container either from such vehicle to another vehicle or to a platform, or vice versa.

Under such circumstances, I find it highly economical to so arrange the mechanism utilized for sliding the container between the truck and platform that the greater part of such mechanism will be carried by the truck, thereby eliminating the requirement for installation of any material amount of permanent equipment at the various shippers' platforms or points of interchange of containers.

The present invention is especially concerned with a mechanism for effecting the interchange of containers, which mechanism may be carried substantially in entirety by the highway vehicle, which transports the container. This, therefore, is the general object of the invention. I prefer to accomplish this object by providing a highway vehicle, such as a truck or trailer, with a cable-winding mechanism, so arranged that a cable may be attached to a container resting on a platform and the winding mechanism operated by the power plant of the truck to draw the container, by a horizontal sliding movement, into suitable guides carried by the vehicle, or the winding mechanism may be operated in a reverse direction to draw the container from such vehicle onto the platform. This, therefore, is a more specific object of the invention.

A further object of the present invention is to so arrange the cable mechanism that containers of various sizes may readily be drawn onto the truck in a direction transverse of the longitudinal axis of the truck. Another object is to provide a vehicle with a cable winding mechanism, certain members of which may be projected beyond the edges of the truck so as to permit the drawing or sliding onto the truck from a platform of a container substantially the same size or larger than the platform of the truck.

Other objects of the present invention will become more apparent from the following description, reference being had to the accompanying drawings which illustrate a preferred embodiment of the invention. The essential characteristics of the invention will be more fully set forth in the claims.

Figure 2:
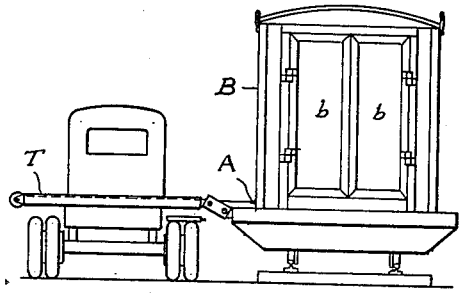
Figure 3:
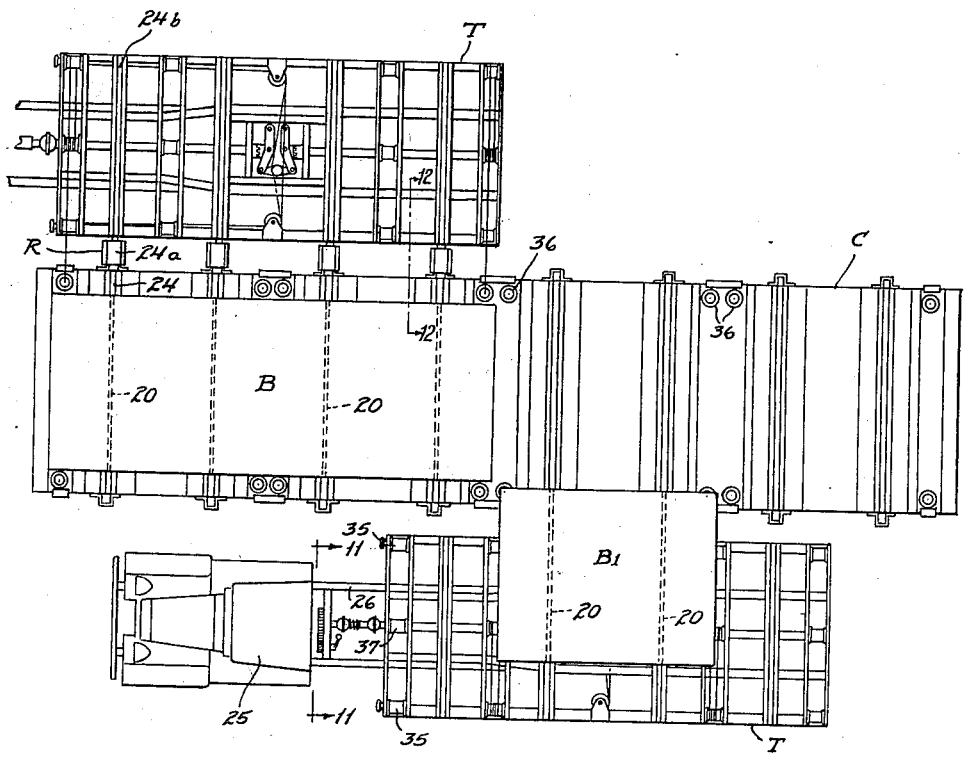
Figure 10:
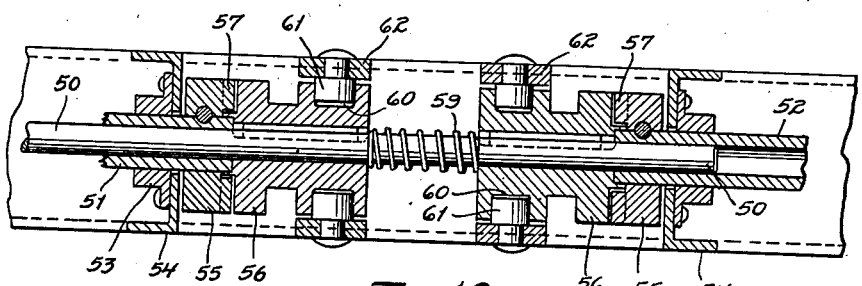
Figure 11:
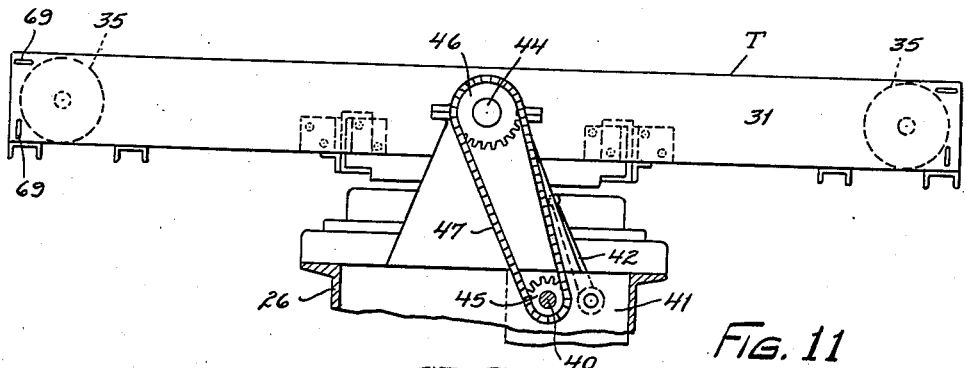
Figure 12:
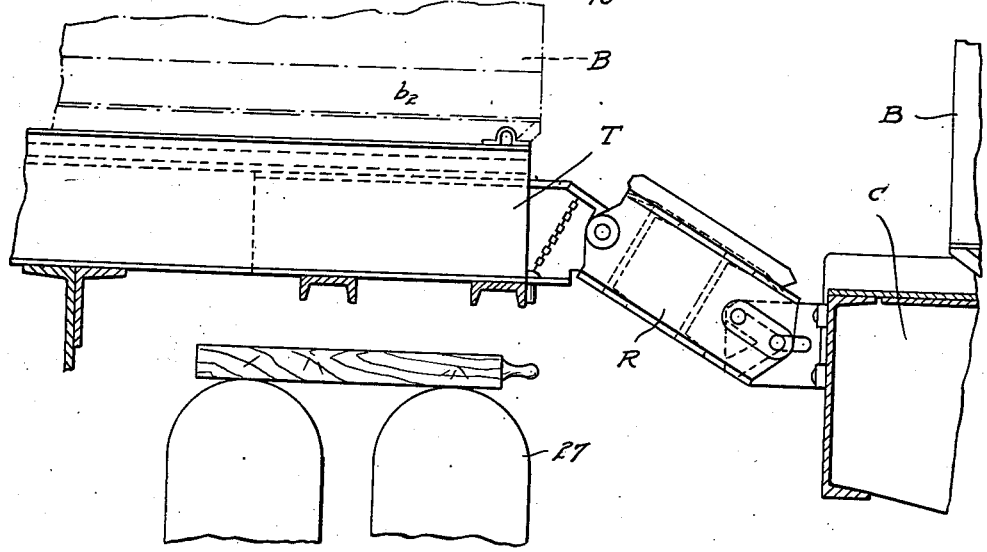

Referring now to the drawings, Fig. 1 illustrates an end elevation of a truck or trailer having a removable container mounted thereon, and a railway car likewise in end elevation to which such container is to be transferred; Fig. 2 is a view similar to Fig. 1, illustrating, however, the container in position on the railway car and the truck alongside ready to receive it; Fig. 3 is a plan view, illustrating a railway car with a truck and trailer unit at either side thereof, one of the trailers having a large size container thereon, which is being moved from the trailer to the car, while the car carries a full-sized container for transfer to the other trailer; Fig. 4 is a plan view on an enlarged scale of the trailer and cable-winding mechanism carried thereby; Fig. 5 is a side elevation of the trailer shown in Fig. 4; Figs. 6 and 7 are transverse vertical sections through the trailer, as indicated by the correspondingly numbered lines on Fig. 4; Figs. 8 and 9 are sectional details, on an enlarged scale, the plane of the sections being indicated by the correspondingly numbered lines on Fig. 4; Fig. 10 is a fragmentary longitudinal vertical section, as indicated by the line 10—10 on Fig. 4; Fig. 11 is a transverse section on the same scale as Figs. 6 and 7, illustrating the trailer in end elevation, the plane of the section being indicated by the line 11—11 on Fig. 3; Fig. 12 is a sectional detail on an enlarged scale illustrating a bridge member or ramp for interconnecting the truck with the railway car, indicated by the line 12—12 on Fig. 3.

The system set out in my copending application heretofore referred to contemplates the sliding or skidding of a removable container between a truck and trailer and a railway car or platform. As shown in Fig. 1, I have illustrated a railway car C, supported by the usual road bed C1. Adjacent to and parallel with the car C is a truck or trailer T, having a removable freight container or body B mounted thereon. The truck has previously been positioned adjacent to and parallel with the railway car and suitable bridge members or ramps R have been interconnected between the trailer and the car.

In Fig. 2 I illustrate the body B as positioned on the flat car C, and the ramp R in position between the car and a truck T. The body B is skidded or slid from the car across the ramp R into position on the trailer by power mechanism carried by the truck and operatively connected with winding drums on the trailer. Cables carried by the drums are attached as at A to the freight container, whereby the power of the truck may be utilized to draw the body from the car C to position on the trailer.

The body B comprises a rectangular freight container having side and end walls supported by a suitable base frame, certain of the walls being provided with doors b to permit the loading or unloading of the container with freight. Rigidly secured to the base frame b2 of the container (Fig. 12) are a pair of rails 20, which extend transversely across the body, as indicated by the dotted lines in Fig. 3. The rails are arranged to slide in aligned guideways 24 of the car, 24a of the ramp, into guideways 24b carried by the trailer. Such guiding elements serve to maintain the body in proper angular position on the carrier and providing smooth surfaces to coact with the body supporting rails 20, which minimize the friction between the container and the carriers.

The truck proper comprises the usual motor cab unit 25, mounted on a chassis frame 26, supported by suitable dirigible forward wheels (not shown) and suitable rear driving wheels 27 (Fig. 5). The truck chassis carries one member of a trailer connecting device 29, the other member of which is detachable therefrom in any well known manner and is carried by the trailer frame.

The trailer T1 comprises the usual longitudinal chassis sills 30 which are connected together by suitable cross members, hereinafter described in detail, and having adjacent their forward ends one member of the connecting device 29, which connects the trailer with the tractor. The transverse frame members of the trailer comprise a series of channels 31 and 32 arranged in pairs, as shown in Fig. 4. The pairs of channels 31 support between them suitable winding drums hereinafter to be described, whereas the channels 32, which are likewise arranged in pairs and spaced apart have secured between them the guide channels 24b of the truck or trailer.

It will be noted in Figs. 3 and 4 that I have shown four guide channel members 24b. These correspond in number and position to the rails carried by the maximum sized body. As illustrated in Fig. 3, however, I contemplate the use of bodies of different sizes. As there shown, the body B1 is smaller than the body B and carries two body rails, so that instead of positioning the two large bodies on the car, four of the small bodies may be positioned thereon, or one large body and two small bodies. In such instances I find it convenient when transferring the body from one place to another by a motor vehicle, to mount the small body substantially in the center of the trailer or truck platform, thereby distributing the load as evenly as possible.

When a body is to be slid to or from the truck, suitable cables are connected as at A, (Fig. 2) to the body, as by means of a hook and eye or a clevis and pin. When transferring the body from a railway car to a truck, one end of each cable is attached to the side of the body adjacent the truck. The cable extends across the truck and is guided thereon by suitable guiding pulleys or drums 35 carried between the cross frame members 31 of the trailer adjacent the outer edges thereof. The cables are then wound around guiding drums which are on the side of the truck further from the car C and extend inwardly to winding drums 37 mounted between the transverse frame members 31 adjacent the longitudinal axis of the trailer.

When it is desired to draw a body or container from the trailer onto the car, the cables pass from the winding drums 37 over guiding drums 35 at the side of the trailer nearest the car and have their ends connected to the retaining devices A on the side of the body nearest the car. Consequently, upon power being applied to rotate the winding drum, the body will be slid from the trailer to the car.

Due to the weight of the loaded container, which may be as much as twenty tons, and due to the differences in elevation between the trailer chassis and railway car, as indicated by Figs. 1, 2 and 12, it becomes desirable to provide a power-operated mechanism for reeving the cables on the cable-winding drum 37. For this purpose I have found it convenient to utilize the truck power plant. Trucks of this type are usually provided with a power take-off mechanism adjacent the transmission, which permits the power of the motor to be applied to a shaft 40 (Fig. 11) through the medium of a supplementary transmission or gear mechanism 41, carried by the truck frame 26, and controlled by a suitable control lever 42. I prefer to drivingly connect the shaft 40 with a shaft 44, by means of suitable sprockets 45 and 46 rigidly secured to the shafts 40 and 44, respectively, and which are interconnected by driving chains 47.

The drive shaft 44 is connected by universal coupling members, and a splined shaft, described in detail in my copending application, with a longitudinal drive shaft 50, carried by the trailer. As shown in Figs. 4, 7 and 10, the drive shaft 50 is rotatably mounted in a pair of tubes 51 and 52, which are themselves rotatable with respect to the shaft 50 and are rotatably journalled in suitable bearings 53, carried by transverse frame members. The tube 51 extends from a point adjacent the center of the trailer forwardly, and has rigidly secured to it the forward winding drums 37 and 37a, the former being used on full-sized bodies, whereas the latter is used only on smaller bodies. The tube 52 extends rearwardly from a point adjacent the center of the truck and carries upon it winding drums 37 and 37a.

I have so arranged the mechanism that the tubes 51 and 52 may be rotated independently to enable the taking up of the slack in the cables, after they have been initially positioned or attached to the body, and drawn the body evenly across the guideways of the carriers.

As shown in Figs. 4 and 10, I have secured clutch members 55 to the innermost end of the tubes 51 and 52. These clutch members are arranged to coact with driving clutches 56, which are splined to the shaft 50 in any suitable manner, thus permitting the shaft to drive either tube or both, as desired, which tubes in turn rotate the various winding drums. The clutch members 56 are normally retained in contact with the coacting clutch members 55 by suitable compression springs 59 encircling the shaft and acting against the opposing faces of the clutch members. This arrangement permits the clutch teeth 57 (Fig. 4) to be inclined or bevelled, so that undue strain on the cables will cause a slipping of the clutch mechanism and will not result in damage to either the truck, trailer or any of the mechanism.

The arrangement of the clutch mechanism is such that it may be controlled by the operator from either side of the trailer adjacent the forward end thereof. As shown in Figs. 4, 7, 8 and 10, the clutch members 56 are provided with annular grooves 60 arranged to receive pins 61 carried by clutch operating levers 62 which are pivoted as at 63 to the frame. The outermost end of each clutch lever 62 has connected thereto, as at 64, a pair of cables 65 and 66, which extend longitudinally of the trailer over suitable guiding sheaves 67 carried on bracket arms 67a, which in turn are secured to longitudinally extending center beams of the platform (Fig. 7). Thence the cables move respectively outwardly toward the outer edge of the chassis, where they are directed around sheave members 67b rotatably mounted on brackets 68 carried on the side frame members of the chassis.

From the pulleys 67b the cables extend forwardly toward the front end of the trailer and have secured to their outer ends handle grips. Each handle grip has a boss portion 70, arranged, when in one position, to enter a recess occupied by the cable in the adjacent frame member 31 through which the cables extend, and when drawn forwardly to disengage its respective clutch mechanism from the driving shaft, the boss 70 bears against the outer surface of the channel and retains the clutch in a disengaged position. It thus becomes apparent that the four control cables extend from their connections 64 with the two members 62 around the central sheave 67 and thence to the outside sheaves 67 at the opposite sides of the body. At each side of the body one of the cables passes over the upper sheave 67 and the corresponding cable from the other bracket 62 passes over the lower sheave, whereupon both cables extend longitudinally of the body to the upper and lower handle grips respectively, as shown in Fig. 8.

The width of a highway vehicle is restricted by highway rules and regulations to a predetermined maximum. It is desirable to provide a body of maximum capacity. Hence, both the body and trailer are built as large as is permitted by such highway rules and regulations. Under such conditions, I find it advisable to so arrange the cable reeving mechanism that when a body is being moved or skidded from a railway car to a truck or trailer, the cable may be attached to one side of the body and the outward guiding drum 35 may be adjustably positioned at a point beyond the normal line of the side of the truck. Such a mechanism is illustrated in Figs. 4 and 6. As there shown, each guiding drum 35 is rotatably mounted on a suitable axle member 80, which is supported by bars 81, slidable inwardly and outwardly from the supporting channel frame members 31.

The bars 81, as shown in Fig. 6, are interconnected by a pair of shaft or axle members 82 and 83, the ends of which extend outwardly beyond the sides of the bars, and are arranged to enter recesses in retaining members 85, which are secured to the cross frame members 31 in any suitable manner. When the truck is in transit, the drums 35 are in the position as shown by the right-hand drum in Fig. 6. In this position, the ends of the pins 82 and 83 are in slots 84 in the retaining members 85.

It thus follows, from the foregoing description that when the apparatus is in position to draw a body onto the truck, as shown in Fig. 6, the cable used to effect this position leaves the central drum and moves toward the left in Fig. 6, passed beneath and around the extended drum 35 and then completely across the truck on top of the drum 35 at the right-hand side and is there connected to the body. Operation of the cable-winding mechanism then causes the body to be pulled onto the truck frame from the right-hand side.

If it should be desired to position the body from the truck from the left-hand side, the described operation will be reversed. That is, the winding cable will pass under and over the drum on the right-hand side, then over the top of the drum on the left-hand side and would be connected to a body on that side of the truck. The purpose of doubling the cable back upon itself is, of course, to permit a body to be completely mounted onto or off of the truck and without the necessity of providing any overhanging on the truck frame to effect such positioning.

When it is desired to move the drum outwardly to position it for drawing a container or body B from a railway car to the trailer, the operator grasps the drum 35 and raises it and draws it outwardly until the forward pin 82 rests in a recess 87 in the guiding member 85, which then acts to prevent longitudinal movement of the bar 81. At the same time the pin 83, which lies in the recess 84, prevents the swinging of the bars around the pin 82. After the load has been positioned on the truck, the operator grasps the drum 35 and raises it until the pin 82 is out of the recess 87 and then pushes it inwardly until the pins 82 and 83 rest in the recess 84, and the drum shaft seats in the retaining recess 87.

In the foregoing description, I have explained my improved cable winding mechanism as being carried by a trailer. However, it is obvious that the mechanism may be mounted on the platform of a standard truck and utilized to draw a container or other load to and from the truck platform. Likewise, the mechanism may be arranged to draw a container or load lengthwise of the truck.

I claim:

1. The combination with a highway vehicle of a shaft, means for applying power thereto, a tube surrounding the shaft and having bearings in the vehicle, winding drums on the tube, and a clutch adapted to connect the tube to the shaft.

2. The combination with a highway vehicle of a longitudinal shaft, means for applying power thereto, a pair of tubes and external supporting bearings for the tubes on the vehicle, winding drums on the tubes, and clutches adapted to connect the tubes to the shaft.

3. The combination with a highway vehicle, of a pair of aligned tubes rotatably mounted in bearings carried on the vehicle, a shaft mounted in the tubes, power mechanism on the vehicle adapted to be selectively coupled to the shaft, and means to drivingly couple the shaft with said tubes.

4. The combination with a tractor and trailer, of a pair of aligned tubes on the trailer, a shaft mounted in the tubes, power mechanism on the tractor adapted to be selectively coupled to the shaft, means to selectively couple the shaft with either tube, and body shifting mechanism operated by the tubes.

5. The combination of a highway vehicle having power mechanism for operating a cable, a rotary guide for the cable, a frame supporting said guide and slidably mounted in the vehicle for movement transversely of the vehicle, whereby the rotary guide may be projected beyond the normal margin of the vehicle frame.

6. The combination with a vehicle, of a pair of aligned tubes journalled therein, a shaft mounted in the tubes, power mechanism on the vehicle adapted to operate the shaft, clutches in the space between the tubes and adapted to couple the shaft with either tube, and body shifting mechanism operated by the tubes.

7. The combination with a wheel mounted vehicle having longitudinal frame members connected by transverse frame members, a pair of aligned tubes journalled in said transverse frame members and spaced apart from each other, a shaft journalled in said tubes and bridging the space between them, means to drive said shaft, clutches carried by said shaft intermediate the adjacent ends of said tubes, means normally acting to maintain said clutches in driving engagement with respective tubes, and means to selectively disengage either clutch as desired.

8. In combination, a trailer having a body with a generally flat top, a longitudinally extending shaft member with winding drums thereon carried by the body below the plane of the top, rotary cable guides mounted at the side of the trailer in transverse alignment with respective winding drums and adapted to guide cables passing from the winding drums about the guides and thence across the top of the trailer, whereby a load may be pulled sidewise fully onto the body of the trailer, a tractor for the trailer having a power shaft, and means drivingly connecting said longitudinal shaft with the power shaft of the tractor.

9. The combination of a wheeled vehicle, having a load-carrying platform with transverse guiding rail effects on its top side, a winding mechanism disposed intermediately of the sides and below the top of the platform, a rotary guide for a cable disposed adjacent a lateral margin of the platform on a horizontal axis below the top surface of the platform, a cable connected with said mechanism passing around the guide from below it, and thence laterally over the platform for attachment to a body located on the side of the vehicle opposite the guide, and means to control the operation of said mechanism from opposite sides of the vehicle whereby such body may be drawn onto said rail effects of the platform.

10. The combination of a road vehicle, having a generally rectangular load-carrying frame, power-driven winding drums intermediately of the sides of the frame, spaced longitudinally of the frame and disposed below the top surface thereof, cable-guiding rollers in transverse alignment with the drums at each side thereof and generally below the top surface, said rollers being adapted to have cables from drums looped about them and passed laterally over the frame to connect with a load to be moved onto the frame, whereby such load may be drawn fully onto the frame from either side of the vehicle and means to control the rotation of said drums from either side of the platform.

11. The combination of a highway vehicle having power mechanism for operating a cable, a cable guide, a horizontally adjustable mounting for the guide carried by the vehicle and by which the guide may be positioned beyond the normal margin of the vehicle and also within the limit of said margin, whereby a body of a size coextensive with the horizontal dimension of the vehicle in a direction normal to said margin may be effectively loaded and the guide carried within the horizontal limits of the vehicle during transit.

12. The combination of a power-driven tractor, a trailer adapted to be drawn thereby, a longitudinally extending shaft on the trailer adapted to be driven by the power on the tractor, winding drums on the trailer adapted to be operated by said shaft, guiding drums on either side of the trailer and movable to a position beyond the trailer sides, whereby cables leading to or from the winding drums may selectively pass about the said drums to skid a load onto the trailer from the side opposite the drum about which the cable is looped.

13. The combination with a wheeled vehicle, of a pair of longitudinally aligned tubes rotatably mounted on said vehicle, each tube extending from one end of the vehicle toward the center thereof, a shaft journalled in one of said tubes and extending into the other, means at one end of the vehicle to drive said shaft, and clutch means disposed at the inner ends of said tubes and slidable axially thereof, said clutch means controlled external of said shaft to selectively couple the tubes with said shaft.

14. The combination of a wheeled vehicle, having a generally flat top, cable guiding drums mounted to turn on horizontal axis, disposed at the sides of the vehicle, below the plane of the top surface thereof, a shaft member with winding drums thereon intermediate said guiding drums and carried by the vehicle below the plane of the top surface thereof, said guiding drums being adapted to guide cables passing from the winding drum upwardly around said guides and thence to either edge of the vehicle, whereby a load may be pulled horizontally onto the vehicle from either edge of the latter and into a position above the horizontal plane of the guiding drum axis with one continuous direction of rotation of said winding drum.

BENJAMIN F. FITCH.